(12) United States Patent
Nagasawa et al.

(10) Patent No.: US 11,306,650 B2
(45) Date of Patent: Apr. 19, 2022

(54) COMBUSTION CHAMBER STRUCTURE OF ENGINE

(71) Applicant: Mazda Motor Corporation, Hiroshima (JP)

(72) Inventors: Takeshi Nagasawa, Hiroshima (JP); Xiyao Ge, Hiroshima (JP); Akira Kageyama, Hiroshima (JP); Hiroyasu Uchida, Higashihiroshima (JP); Ryo Kiyosue, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/916,733

(22) Filed: Jun. 30, 2020

(65) Prior Publication Data

US 2021/0010413 A1  Jan. 14, 2021

(30) Foreign Application Priority Data

Jul. 10, 2019  (JP) .............................. JP2019-128782

(51) Int. Cl.
  *F02B 47/02*  (2006.01)
  *F02M 25/03*  (2006.01)
  *F02M 25/022*  (2006.01)
  *F02B 7/02*  (2006.01)

(52) U.S. Cl.
  CPC ......... *F02B 47/02* (2013.01); *F02M 25/0224* (2013.01); *F02M 25/0227* (2013.01); *F02M 25/03* (2013.01); *F02B 7/02* (2013.01)

(58) Field of Classification Search
  CPC ........... F02B 7/02; F02B 47/02; F02M 25/03; F02M 25/0227; F02M 25/0224
  See application file for complete search history.

(56) References Cited

U.S. PATENT DOCUMENTS

| 4,120,268 A | * | 10/1978 | Bastenhof | F02M 25/0225 |
| | | | | 123/25 C |
| 2013/0327289 A1 | * | 12/2013 | Hiratsuka | F02F 3/12 |
| | | | | 123/193.6 |
| 2017/0022924 A1 | * | 1/2017 | Fujimoto | F02M 25/0224 |

FOREIGN PATENT DOCUMENTS

| JP | 2002174135 A | * | 6/2002 | ........... F02D 35/028 |
| JP | 6477849 B1 | | 3/2019 | |

* cited by examiner

*Primary Examiner* — Kevin A Lathers
(74) *Attorney, Agent, or Firm* — Alleman Hall Creasman & Tuttle LLP

(57) ABSTRACT

An engine system includes a combustion chamber including a cylinder formed in an engine and a piston configured to reciprocate inside the cylinder, a spark plug disposed in a ceiling part of the combustion chamber, and a water injection device configured to inject water into the combustion chamber through a plurality of nozzle holes facing the inside of the combustion chamber. The piston has a cavity in an upper surface thereof. The water injection device injects water into the cavity in a compression stroke at a timing when an extension of axes of at least some of the nozzle holes intersects the cavity. The cavity has a bottom part where the water injected by the water injection device collides, and a raising part configured to raise the water spreading along the bottom part toward the water injection device.

20 Claims, 12 Drawing Sheets

COMBUSTION CHAMBER STRUCTURE OF ENGINE

TECHNICAL FIELD

The technology disclosed herein relates to a combustion chamber structure of an engine.

BACKGROUND OF THE DISCLOSURE

JP6477849B1 discloses a compression ignition engine which combusts a portion of a mixture gas by compression ignition. This engine ignites the mixture gas by an ignition device. Flame propagation combustion begins, and unburnt mixture gas carries out self-ignition combustion by heat generated by the flame propagation combustion.

The engine is provided with a water injection device which injects water into the combustion chamber. As the water injection device injects water into the combustion chamber, the inside of the combustion chamber is cooled. This engine can reduce the occurrence of abnormal combustion.

In addition to the above-described purpose of reducing the abnormal combustion, the present inventors focused on an increase in an amount of operative gas by injecting the water (and steam) into the combustion chamber to increase a workload of a piston of the engine, thereby improving engine torque.

However, the present inventors found that combustion stability was lowered, if the water is injected into the engine combustion chamber for the purpose of improvement of the torque. This is because a large amount of water has to be injected into the combustion chamber when increasing the engine torque. That is, if the amount of water injected into the combustion chamber increases, the concentration of water near the spark plug becomes higher, and therefore, igniting the mixture gas by the spark plug becomes difficult.

SUMMARY OF THE DISCLOSURE

The technology disclosed herein enables ignition of a mixture gas, even if water is injected into a combustion chamber.

As a result of the examination of the above-described problem by the present inventors, they found a combination of a structure of the combustion chamber and an injection mode, which is capable of reducing a diffusion of the water. The technology disclosed herein is completed based on these new findings from the present inventors.

According to one aspect of the present disclosure, an engine system is provided, which includes a combustion chamber including a cylinder formed in an engine and a piston configured to reciprocate inside the cylinder, a spark plug disposed in a ceiling part of the combustion chamber, and a water injection device configured to inject water into the combustion chamber through a plurality of nozzle holes facing the inside of the combustion chamber. The piston has a cavity in an upper surface thereof. The water injection device injects water into the cavity in a compression stroke at a timing when an extension of axes of at least some of the nozzle holes intersects the cavity. The cavity has a bottom part where the water injected by the water injection device collides, and a raising part configured to raise the water spreading along the bottom part toward the water injection device.

During a compression stroke, a flow of gas inside the combustion chamber is weaker than that during an intake stroke. According to this configuration, by the water injection device injecting water in a compression stroke, diffusion of the water by the flow of gas is reduced. Note that the water injection device may inject water vapor inside the combustion chamber instead of water. "Water" as used herein includes water vapor which is a gas. Since the water does not consume combustion heat or consumes only a little if injecting water vapor into the combustion chamber, it is advantageous in improving thermal efficiency of the engine.

In this configuration, the water injection device injects the water into the cavity at the timing when the extension of axes of at least some of the nozzle holes intersect the cavity. The injected water reaches inside the cavity.

The cavity has the bottom part and the raising part which raises the water spreading along the bottom part toward the water injection device. According to the present inventors' examination, they found that by injecting water toward the cavity having the raising part, the water is suppressed from spreading to areas other than the cavity. The water is kept, or mostly kept, within an area in the cavity so that the concentration of water near the spark plug is kept low even if the water is injected into the combustion chamber. Thus, the spark plug can stably ignite the mixture gas.

Moreover, injecting water into the combustion chamber increases an amount of operative gas, and thus, the torque of the engine improves. An automobile mounted with this engine exhibits improved fuel efficiency.

Note that the phrase the "area in the cavity" as used herein refers to an area which is comprised of an area inside the cavity dented from the upper surface of the piston, and an area from a projected surface of the opening of the cavity which is projected toward the ceiling part of the combustion chamber in an axial direction of the cylinder, to the opening of the cavity. Moreover, the "areas other than the cavity" as used herein are areas other than the "area in the cavity."

The bottom part may be comprised of a flat surface perpendicular to the axis of the cylinder, and the raising part may be comprised of a side wall perpendicular to the bottom part.

According to the present inventors' examination, they found that if the side wall perpendicular to the flat bottom part is provided, the water having entered the cavity is effectively raised toward the water injection device. By injecting water by the water injection device toward the cavity having this configuration, diffusion of the water inside the combustion chamber is further reduced.

A heat barrier layer configured to reduce heat transfer into the piston may be provided to the upper surface of the piston and the surface of the cavity.

The heat barrier layer reduces a cooling loss of the engine. Moreover, when the cavity is comprised of the flat bottom part and the side wall perpendicular to the bottom part as described above, the shape of the cavity is not complicated and the heat barrier layer is easily formed on the surface of the cavity.

At least some of the nozzle holes of the water injection device may be directed toward the raising part of the cavity at a timing of injecting the water.

The water injected inside the cavity is slowed down while spreading along the bottom part. If a flow velocity of the water is low when the flow reaches the raising part, the water becomes difficult to be raised. According to this configuration, at least some of the water injected by the water injection device reaches near the raising part of the cavity. Therefore, the raising part can raise the water, while the flow velocity of the water is high. By raising the water toward the water injection device, the water spreading to areas other than the cavity can be effectively suppressed.

The water injection device may be disposed in the ceiling part, and at least a part of an injection surface of the water injection device, where the nozzle holes open may be located at a position of the cavity in a direction perpendicular to the axis of the cylinder. The spark plug may be installed at a position offset from the cavity in the direction perpendicular to the axis of the cylinder.

At least the part of the injection surface of the water injection device is located right above the cavity with respect to the axis direction of the cylinder. Accordingly, even if the position of the piston changes, the water injection device can inject the water toward the cavity. In other words, even if the timing of the water injection device injecting the water changes, the water injection device injects the water toward the cavity. The injected water is kept, or mostly kept, within an area in the cavity.

Moreover, the spark plug is installed at a position offset from the cavity. Since the water is kept or mostly kept within the area in the cavity, the concentration of water near the spark plug is low. Thus, the spark plug can stably ignite the mixture gas.

The axes of all the nozzle holes of the water injection device may be parallel or substantially parallel to each other.

According to the present inventors' examination, if the axes of the plurality of nozzle holes are parallel or substantially parallel to each other, jet flows of the water injected by the water injection device become difficult to spread in a direction perpendicular to the injecting direction. Since the water flows injected into the combustion chamber from the plurality of nozzle holes move in the same or almost the same direction, the momentum of the water jet flows which move in this direction increases. When the momentum of the jet flow increases, a force which draws in the fluid around the water jet flows injected by the water injection device into the jet flows becomes stronger. Thus, by the drawing-in effect becoming stronger, the diffusion of the water is reduced.

Moreover, the water raised by the raising part toward the water injection device is drawn toward the jet flows by the drawing-in effect of the water jet flows described above. That is, the raised water is prevented from spreading to areas other than the cavity.

By the combination of the raising part of the cavity and the injection mode of the water injection device, the water is kept or mostly kept within the area in the cavity. Thus, the diffusion of the water inside the combustion chamber is reduced, and even if a large amount of water is injected into the combustion chamber, the spark plug can stably ignite the mixture gas.

A distance between the centers of the nozzle holes may be 5 mm or less.

If the distance between the centers of the nozzle holes is short, the density of the water in the jet flows injected by the water injection device increases. If the density of the water is higher, the drawing-in effect of the fluid around the jet flows becomes stronger due to the increase in the momentum. According to the present inventors' examination, they found that, if the distance between the centers of the nozzle holes is 5 mm or less, the diffusion of the water is reduced more effectively. That is, even if a large amount of water is injected into the combustion chamber, the spark plug can stably ignite mixture gas.

When the compression stroke is divided into three stages of an early stage, a middle stage, and a late stage, the water injection device may inject the water during a period from the early stage to the middle stage of the compression stroke.

As will be described later, increasing the temperature of the water injected into the combustion chamber causes the water to vaporize without using combustion heat, and it is advantageous in improving the thermal efficiency of the engine. During the period from the early stage to the middle stage of the compression stroke, the pressure inside the combustion chamber is relatively low. Since the boiling point of water reduces as the pressure inside the combustion chamber decreases, evaporated water is injected into the combustion chamber even at low temperatures. That is, by injecting the water during the period from the early stage to the middle stage of the compression stroke, the amount of heat required for heating the water can be saved. This configuration is advantageous in improving fuel efficiency of an automobile mounted with this engine.

When an engine load is low, an amount of water injected by the water injection device may be less than when the engine load is high. When the injection amount of water is small, the water injection device may delay a start timing of the injection more than when the injection amount of water is large.

If the water is injected into the combustion chamber at an early timing in a compression stroke, a compression resistance of the piston increases. Delaying the injection timing of the water is advantageous in improving the thermal efficiency of the engine. In a case where the injection amount of water is small and the injection period of water is short, the water injection device delays the start timing of the injection. Thus, the compression resistance of the piston reduces, which is advantageous in improving the thermal efficiency of the engine.

On the other hand, when the injection amount of water increases, the period in which the water injection device injects water extends. When the amount of water is large, the water injection device advances the start timing of the water injection. The water injection device completes the injection before the middle stage of the compression stroke. Therefore, the amount of heat required for heating the water can be saved as described above.

The water injection device may be provided with a heating device configured to heat the water injected by the water injection device.

According to this configuration, water vaporized by heating is injected into the combustion chamber. It is reduced that the injected water into the combustion chamber consumes combustion heat. This is advantageous in improving the thermal efficiency of the engine.

The heating device may have a heat exchanger attached to an exhaust pipe of the engine. The heat exchanger may heat the water by heat of exhaust gas of the engine before supplying the water to the water injection device.

According to this configuration, exhaust heat of the engine is collected via water and vaporized water is injected into the combustion chamber. Therefore, the thermal efficiency of the engine improves.

The water injection device may have a water injection valve, and a temperature increasing part provided between the water injection valve and the combustion chamber, and configured to raise temperature of the water injected by the water injection valve before supplying the water to the combustion chamber. The heating device may have a heat pipe configured to send the heat of exhaust gas of the engine to the temperature increasing part.

According to this configuration, exhaust heat of the engine is collected and vaporized water is injected into the combustion chamber. Therefore, the thermal efficiency of the engine improves.

The engine system may include a water supply device configured to supply water to the water injection device. The water supply device may include a condenser configured to condense water inside exhaust gas of the engine, a water tank configured to collect water condensed by the condenser, and a water pump configured to pressurize water inside the water tank and supply the water to the water injection device.

According to this configuration, a user does not need to feed water for injecting into the combustion chamber into the water tank. In addition, since water is pressurized by the water pump, the water is injected into the high-pressure combustion chamber in the compression stroke. At least a part of the injected water injected is evaporated by a decompression boiling effect. Therefore, the amount of heat required for vaporization of the water can be saved.

The engine system may include a fuel injection valve configured to inject fuel, the fuel injection valve being disposed in an intake port communicating with the combustion chamber.

According to this configuration, homogeneous mixture gas is formed inside the combustion chamber. Thus, the spark plug can stably ignite the mixture gas, even if water is injected into the combustion chamber.

The engine may be a compression ignition gasoline engine in which at least a portion of the mixture gas combusts by compression ignition.

The mixture gas is combusted more stably by compression ignition, even if water exists in the combustion chamber.

DETAILED DESCRIPTION OF THE DISCLOSURE

Hereinafter, one embodiment of a structure of a combustion chamber of an engine is described with reference to the accompanying drawings. The combustion chamber structure described herein is merely illustration.

Figure 1:
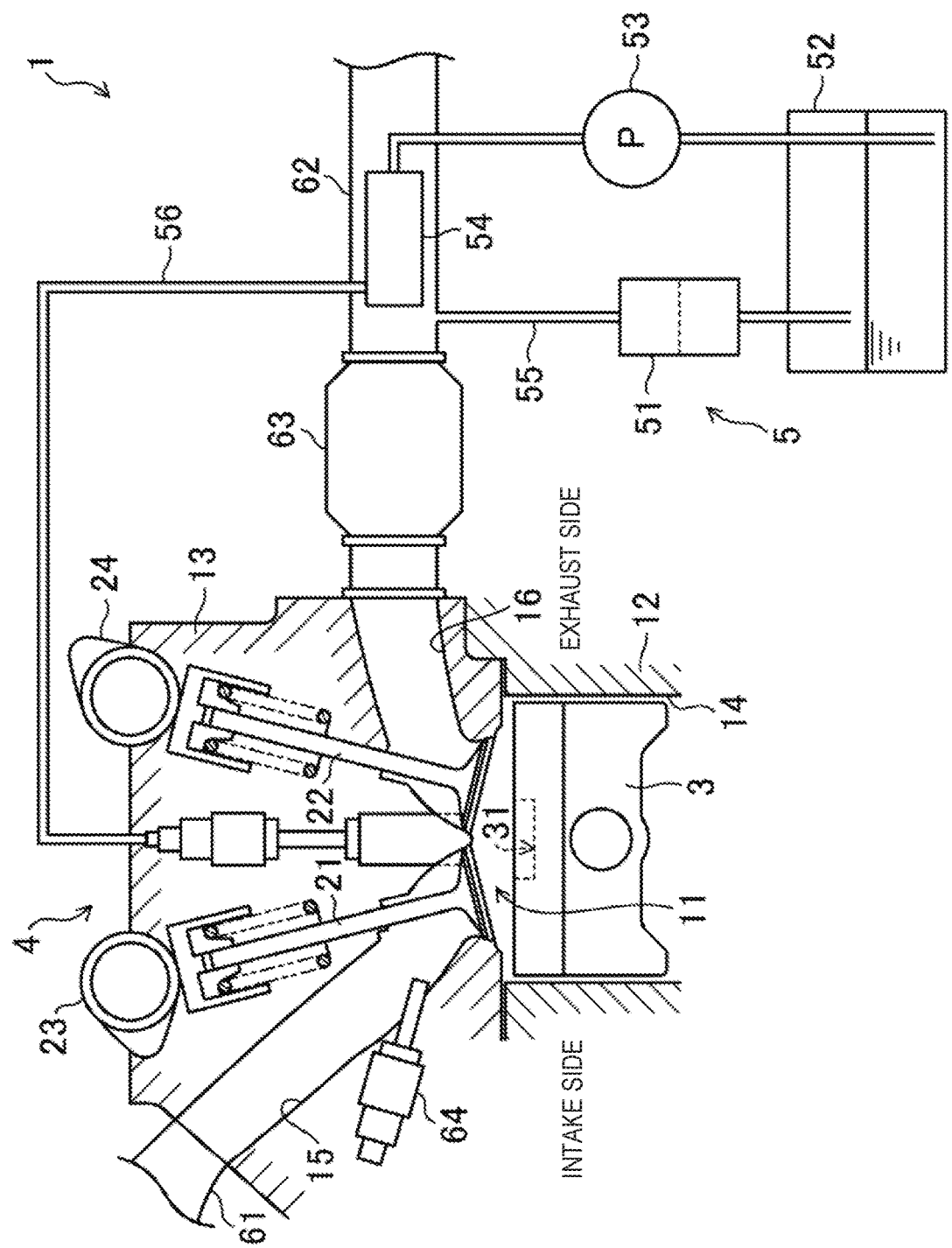
FIG. 1 is a view illustrating an engine to which a combustion chamber structure disclosed herein is applied.

FIG. 1 illustrates an engine 1 to which the combustion chamber structure disclosed herein is applied. The engine 1 is a four-stroke reciprocating engine which operates by a combustion chamber 11 repeating an intake stroke, a compression stroke, an expansion stroke, and an exhaust stroke. For example, the engine 1 is mounted on a four-wheel automobile. The automobile is propelled by the engine 1 operating. Fuel of the engine 1 is gasoline in this example. The fuel is liquidous fuel which at least includes gasoline. For example, the fuel may be gasoline which includes bioethanol.

Figure 3:
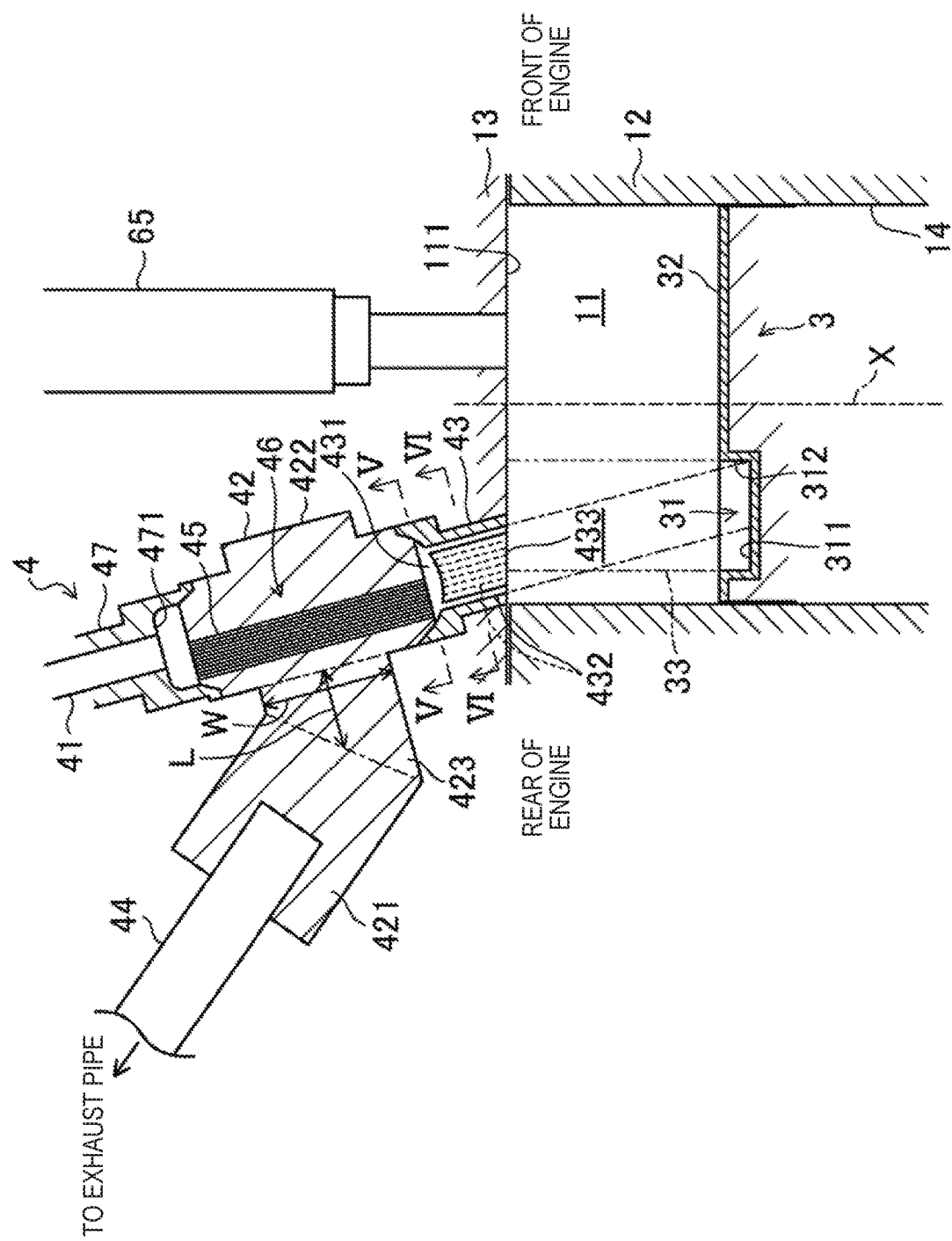
FIG. 3 is an enlarged cross-sectional view illustrating the combustion chamber.

The engine 1 includes a cylinder block 12 and a cylinder head 13 placed on the cylinder block 12. A plurality of cylinders 14 are formed inside the cylinder block 12. The engine 1 is a multi-cylinder engine. FIGS. 1 and 3 illustrate only one cylinder 14.

A piston 3 is inserted in each cylinder 14. The piston 3 reciprocates inside the cylinder 14. Although illustration is omitted, each piston 3 is coupled to a crankshaft through a connecting rod.

The piston 3 forms the combustion chamber 11 with the cylinder 14 and the cylinder head 13. Note that the term "combustion chamber" is used herein in a broad sense. That is, the term "combustion chamber" means a space formed by the piston 3, the cylinder 14, and the cylinder head 13, regardless of the position of the reciprocating piston 3.

An intake port 15 is formed in the cylinder head 13 for every cylinder 14. The intake port 15 communicates with the combustion chamber 11. An intake valve 21 is disposed at each intake port 15. The intake valve 21 opens and closes the intake port 15. The intake valve 21 is opened and closed by rotation of a cam 23. Note that a valve operating mechanism which opens and closes the intake valve 21 is a linearly moving type in this example. The structure of the valve operating mechanism of the intake valve 21 is not limited to the specific type.

An exhaust port 16 is also formed in the cylinder head 13 for every cylinder 14. The exhaust port 16 also communicates with the combustion chamber 11. An exhaust valve 22 is disposed at the exhaust port 16. The exhaust valve 22 opens and closes the exhaust port 16. The exhaust valve 22 is opened and closed by rotation of a cam 24. Note that the valve operating mechanism which opens and closes the exhaust valve 22 is a linearly moving type in this example. The structure of the valve operating mechanism of the exhaust valve 22 is not limited to the specific type.

An intake pipe 61 is connected to one side surface part (the left side surface part in FIG. 1) of the engine 1. The intake pipe 61 communicates with the intake port 15. Gas to be introduced into the combustion chamber 11 flows through the intake pipe 61. Although illustration is omitted, a throttle valve 66 (see FIG. 10) is disposed in the intake pipe 61. Note that in the following description, the side on the engine 1 at which the intake pipe 61 is connected may be referred to as an "intake side."

An exhaust pipe 62 is connected to the other side surface part (the right-side surface part in FIG. 1) of the engine 1. The exhaust pipe 62 communicates with the exhaust port 16. Exhaust gas discharged from the combustion chamber 11 flows through the exhaust pipe 62. A catalytic converter 63 is disposed in the exhaust pipe 62. For example, the catalytic converter 63 has a three-way catalyst. The catalytic converter 63 purifies exhaust gas. Note that in the following description, the side of the engine 1 at which the exhaust pipe 62 is connected may be referred to as an "exhaust side."

An injector 64 is attached to the cylinder head 13 for every cylinder 14. The injector 64 is disposed at the intake port 15. The injector 64 injects fuel into the intake port 15. Although detailed illustration is omitted, the injector 64 is a multiple nozzle type fuel injection valve having a plurality of nozzles, for example. Note that the attached position of the injector 64 illustrated in FIG. 1 is one example. The injector 64 may be disposed in the combustion chamber 11, instead of being disposed at the intake port 15. The injector 64 may directly inject fuel into the combustion chamber 11.

As illustrated in FIG. 3, spark plugs 65 are attached to the cylinder head 13. The spark plug 65 is attached for each cylinder 14. The spark plug 65 is attached to a ceiling part 111 of the combustion chamber 11. Although detailed illustration is omitted, the spark plug 65 has electrodes which face the inside of the combustion chamber 11. By spark(s) discharged between the electrodes, the spark plug 65 forcibly ignites a mixture gas inside the combustion chamber 11. The spark plug 65 may perform a plasma arc discharge. As illustrated by a one-dot chain line in FIG. 2, the spark plug 65 is disposed at an intermediate position of the intake side and the exhaust side of the engine 1. As also illustrated in FIG. 3, the spark plug 65 is disposed at the front side of the engine 1 with respect to the center axis X of the cylinder 14. The spark plug 65 is located at a position near the center axis X of the cylinder 14. As one example, the spark plug 65 is disposed so as to be straightly along the axis of the cylinder 14.

When the spark plug 65 forcibly ignites mixture gas, the mixture gas starts SI (Spark Ignition) combustion by flame propagation. Then, CI (Compression Ignition) combustion of unburnt mixture gas is carried out by self-ignition in response to an increase in the temperature inside the combustion chamber 11 due to a generation of heat by SI combustion, and/or an increase in the pressure inside the combustion chamber 11 by flame propagation. This engine 1 is compression ignition gasoline engine in which at least a portion of the mixture gas combusts by compression ignition.

(Configuration for Injecting Water into Combustion Chamber)

This engine 1 is provided with a water injection device 4 and a water supply device 5. The water injection device 4 injects water into the combustion chamber 11. The water supply device 5 supplies water to the water injection device 4. The engine 1 injects water into the combustion chamber 11 to increase operative gas, thereby, increasing the piston work of the engine 1. Moreover, the engine 1 injects water into the combustion chamber 11 to cool the inside of the combustion chamber 11, thereby reducing the occurrence of abnormal combustion.

In order to improve the torque of the engine 1, a large amount of water must be injected into the combustion chamber 11. However, according to an examination of the present inventors, they found out that the combustion stability is lowered if a large amount of water is injected into the combustion chamber 11. This is because, if the amount of water injected into the combustion chamber 11 increases, a concentration of water near the spark plug 65 increases, and therefore, it becomes difficult for the spark plug 65 to ignite the mixture gas.

Thus, the water injection device 4 is configured so that the spark plug 65 stably ignites the mixture gas, even if a large amount of water is injected into the combustion chamber 11.

As illustrated in FIG. 3, the water injection device 4 is attached to the cylinder head 13. The water injection device 4 is attached for every cylinder 14. The water injection device 4 is attached to the ceiling part 111 of the combustion chamber 11. As illustrated by a one-dot chain line in FIG. 2, the water injection device 4 is disposed at an intermediate position of the intake side and the exhaust side of the engine 1. The water injection device 4 is disposed at the rear side of the engine 1 with respect to the center axis X of the cylinder 14. The water injection device 4 is located at a position distant from the center of the combustion chamber 11. The water injection device 4 is separated from the spark plug 65. The water injection device 4 is inclined to the axis of the cylinder 14. In more detail, the water injection device 4 is inclined in a direction approaching the center axis X of the cylinder 14 as it goes downwardly. Note that the water injection device 4 may be attached to the cylinder head 13 straightly along the axis of the cylinder 14. Details of the structure of the water injection device 4 will be described later.

Figure 4:
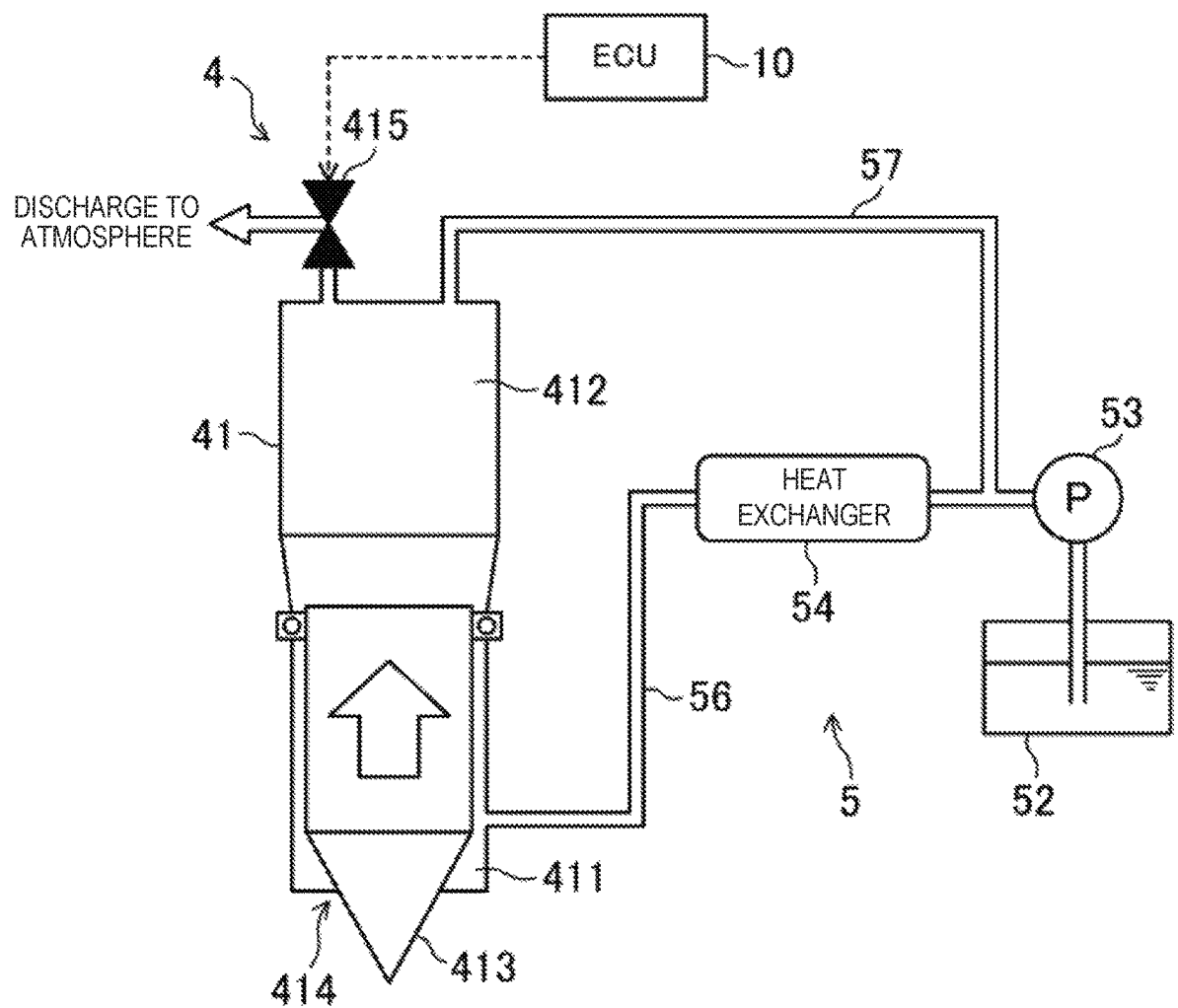
FIG. 4 is a view illustrating one example of a configuration of a water supply device and a water injection valve.

The water supply device 5 is connected to the water injection device 4. The water supply device 5 condenses water inside exhaust gas, and supplies the condensed water to the water injection device 4. As illustrated in FIGS. 1 and 4, the water supply device 5 has a condenser 51, a water tank 52, a water pump 53, and a heat exchanger 54. The water supply device 5 includes a heating device which heats water.

The condenser 51 condenses water inside exhaust gas extracted from the exhaust pipe 62. The condenser 51 is connected to an extraction pipe 55. The extraction pipe 55 connects the exhaust pipe 62 with the condenser 51. The water tank 52 collects water condensed by the condenser 51. The water tank 52 is connected with the water injection device 4 through a first feed pipe 56. The water pump 53 and the heat exchanger 54 are provided at intermediate parts of the first feed pipe 56. The water pump 53 sucks water inside the water tank 52 and discharges it to the heat exchanger 54.

The heat exchanger 54 is attached to the exhaust pipe 62. The heat exchanger 54 exchanges heat between exhaust gas and water. Water is heated by waste heat of the engine 1. High-temperature and high-pressure water which is pressurized by the water pump 53 and heated by the heat exchanger 54 is sent to the water injection device 4.

As illustrated in FIG. 3, the water injection device 4 has a water injection valve 41, a temperature increasing part 42, a nozzle part 43, and a heat pipe 44. Note that FIG. 3 illustrates only the tip-end part of the water injection valve 41. The water injection device 4 also includes a heating device which heats water.

As illustrated in FIG. 4, the water injection valve 41 injects water into the combustion chamber 11 in response to a signal from an ECU (Engine Control Unit) 10 described later. The water injection valve 41 has a high-temperature chamber 411 and a low-temperature chamber 412. The high-temperature chamber 411 and the low-temperature chamber 412 are partitioned therebetween. The first feed pipe 56 described above is connected to the high-temperature chamber 411. High-temperature and high-pressure water pressurized by the water pump 53 and heated by the heat exchanger 54 is supplied to the high-temperature chamber 411. A second feed pipe 57 is connected to the low-temperature chamber 412. The second feed pipe 57 branches from the first feed pipe 56 at a location between the water pump 53 and the heat exchanger 54. The second feed pipe 57 bypasses the heat exchanger 54. Low-temperature and high-pressure water pressurized by the water pump 53 and bypassing the heat exchanger 54 is supplied to the low-temperature chamber 412. The low-temperature and high-pressure water is control fluid for opening and closing a needle valve 413, as will be described later.

The needle valve 413 closes a nozzle hole 414 formed in the high-temperature chamber 411. A tip end of the needle valve 413 opens and closes the nozzle hole 414. A base end of the needle valve 413 receives pressure of water inside the low-temperature chamber 412. The needle valve 413 closes the nozzle hole 414 by receiving back pressure. A control valve 415 is provided to the low-temperature chamber 412. For example, the control valve 415 is a solenoid valve. The control valve 415 opens and closes in response to a control signal from the ECU 10. When the control valve 415 opens, water inside the low-temperature chamber 412 is discharged to the atmosphere. Then, the pressure inside the low-temperature chamber 412 drops, and the needle valve 413 raises so as to open the nozzle hole 414 (see a white arrow in FIG. 4). When the needle valve 413 opens the nozzle hole 414, the high-temperature and high-pressure water inside the high-temperature chamber 411 is injected from the nozzle hole 414. A portion of the water injected from the nozzle hole 414 is evaporated by a decompression boiling effect.

The solenoid valve is comparatively low in heat-resistant temperature. As described above, by not heating the control fluid supplied to the low-temperature chamber 412, the reliability of the control valve 415 improves. In addition, the loss of the thermal energy of the engine 1 can be lowered by not heating the control fluid discharged to the atmosphere.

As illustrated in FIG. 3, the temperature increasing part 42 of the water injection device 4 is provided between the water injection valve 41 and the combustion chamber 11. The temperature increasing part 42 raises the temperature of water injected from the water injection valve 41 before supplying to the combustion chamber 11. The water injection device 4 can supply only vaporized water to the combustion chamber 11 by the decompression boiling described above and the temperature increase of the temperature increasing part 42. The water can be evaporated and expanded by supplying the evaporated water to the combustion chamber 11, without consuming combustion heat generated during combustion of the mixture gas. This structure is advantageous in an improvement of the thermal efficiency of the engine 1.

The temperature increasing part 42 has an attachment part 421, a body part 422, and a heat conducting part 423. The body part 422 is attached at a tip end of the water injection valve 41. The heat conducting part 423 continues to a side part of the body part 422. The attachment part 421 is connected to the body part 422, having the heat conducting part 423 therebetween.

A tip-end part of the heat pipe 44 is attached to the attachment part 421. Although illustration is omitted, a base-end part of the heat pipe 44 is attached to the exhaust pipe 62. The heat pipe 44 sends heat of exhaust gas to the temperature increasing part 42.

Figure 5:
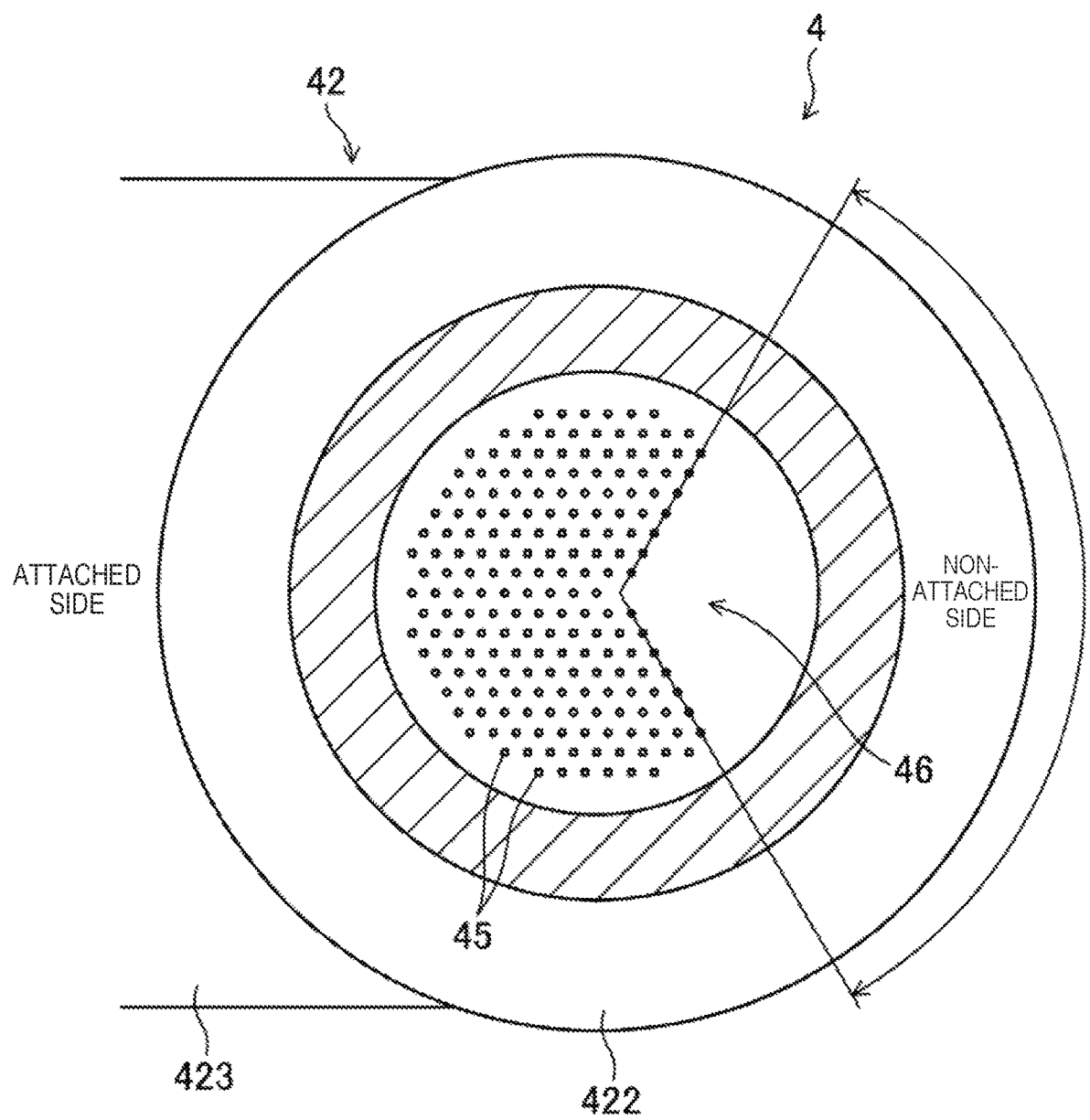
FIG. 5 is a cross-sectional view taken along a line V-V in FIG. 3.

The body part 422 is a substantially cylindrical block. The body part 422 stores heat from the heat pipe 44. As illustrated in FIG. 5, a large number of passages 45 are formed in a central part of the body part 422. Water flows through each passage 45. The body part 422 heats water flowing through the passages 45. As illustrated in FIG. 3, each passage 45 opens in each of an upper end surface and a lower end surface of the body part 422. Each passage 45 extends straightly from the upper end surface to the lower end surface of the body part 422 in an axial direction of the body part 422. As described above, since the water injection device 4 is inclined to the axis of the cylinder 14, each passage 45 is also inclined to the axis of the cylinder 14.

The plurality of passages 45 are located at an equal interval. Here, the plurality of passages 45 are not disposed symmetrically to the center of the body part 422. The body part 422 has a non-passage part 46 in which any passage 45 is not formed. The non-passage part 46 is provided at a non-attached side of the body part 422, when dividing the body part 422 into two which are comprised of one side where the heat pipe 44 is attached through the heat conducting part 423 (attached side) and the other, opposite side (non-attached side). In the example of FIG. 5, the non-passage part 46 has a substantially sector shape. The passage 45 is provided to the attached side of the body part 422 and a part of the non-attached side.

The non-passage part 46 is separated from the heat pipe 44. The heat of the heat pipe 44 is difficult to conduct to the non-passage part 46. Even if the passage(s) 45 is formed in the non-passage part 46, the body part 422 cannot give sufficient heat to the water flowing through the non-passage part 46, and therefore, the water may not evaporate. If the water that has not been evaporated is injected into the combustion chamber 11, the water absorbs combustion heat. In this case, the thermal efficiency of the engine 1 decreases.

On the other hand, if the non-passage part 46 where the passage(s) 45 is not formed is formed in the body part 422, the body part 422 can fully give the heat to the water passing through the passage(s) 45, and therefore, it becomes possible to evaporate all the water. Therefore, injection of unevaporated water into the combustion chamber 11 is prevented. The torque of the engine 1 improves, while a decrease in thermal efficiency of the engine 1 is suppressed.

The heat conducting part 423 connects the body part 422 with the attachment part 421. The heat conducting part 423 is formed so as to connect the body part 422 with the attachment part 421 at the shortest distance. The length L of the heat conducting part 423 is short. Moreover, the heat conducting part 423 has a given width W in an extending direction of the passage 45 of the body part 422. The width W is more than a half of the length of the passage 45. Since the length L of the heat conducting part 423 is short and the width W is large, the heat resistance of the heat conducting part 423 is low. The heat conducting part 423 can efficiently conduct the heat of the heat pipe 44 to the body part 422.

Note that the water injection valve 41 is connected with the body part 422 of the temperature increasing part 42 through a connecting part 47. A recess 471 is formed in the connecting part 47 so that it dents from a lower end of the connecting part 47 (i.e., a lower end in FIG. 3). A tip end of the water injection valve 41 is coupled to the recess 471. Moreover, an upper end surface of the body part 422 is located inside the recess 471. As described above, the passages 45 open at the upper end surface of the body part 422. The recess 471 functions as a distributing part which distributes water injected from the water injection valve 41 to a plurality of nozzle holes 432.

The nozzle part 43 of the water injection device 4 is attached to a lower end of the body part 422 of the temperature increasing part 42. The nozzle part 43 has a recess 431 dented from an upper end thereof, and the plurality of nozzle holes 432. Each nozzle hole 432 is coupled to the recess 431 and opens at a lower end surface of the nozzle part 43. All the water which flows out from the passage 45 of the body part 422 once enters into the recess 431 and is then distributed to the plurality of nozzle holes 432.

Figure 2:
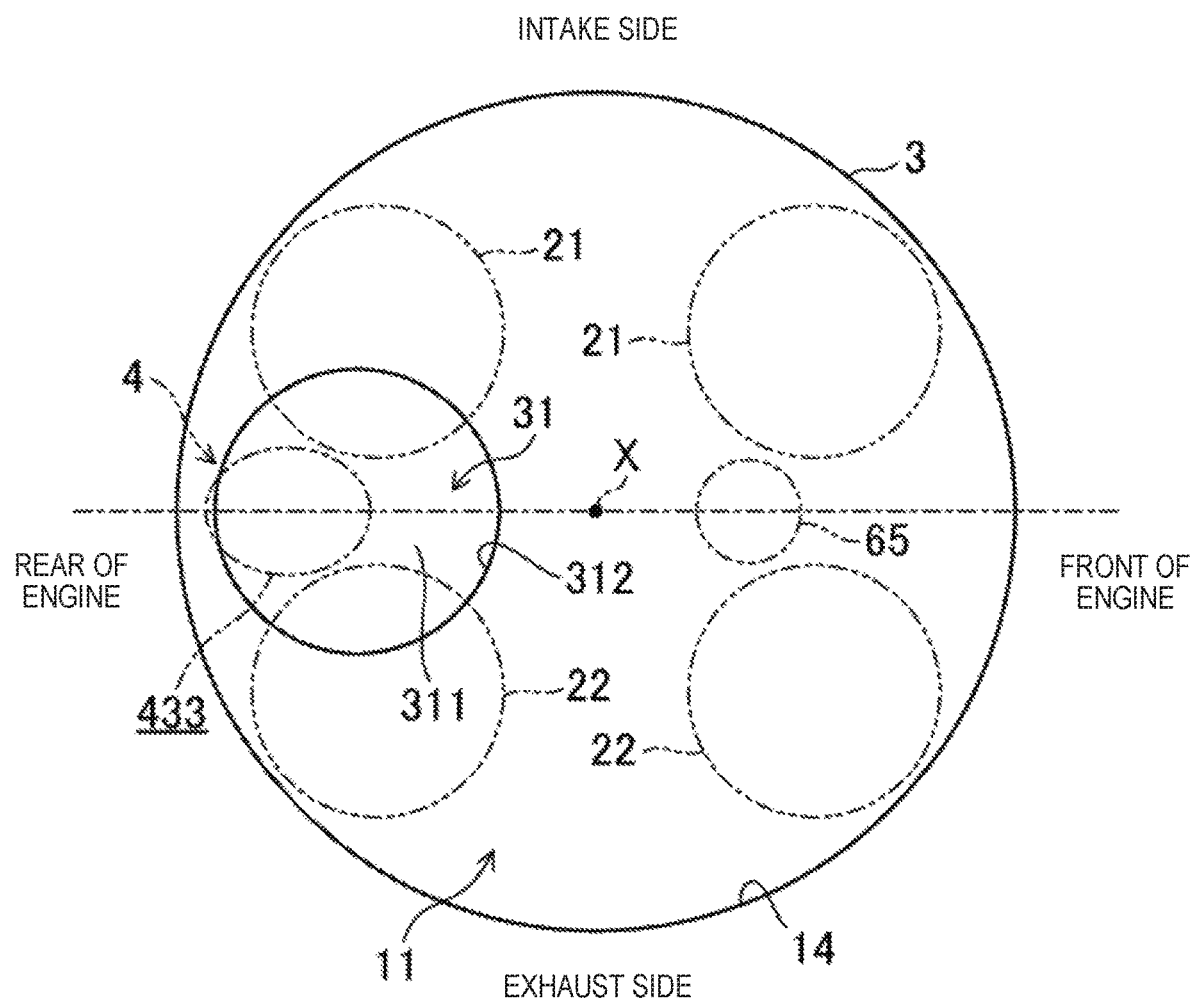
FIG. 2 is a plan view of a combustion chamber.

A lower end surface of the nozzle part 43 corresponds to an injection surface 433 of the water injection device 4. As described above, the plurality of nozzle holes 432 open at the injection surface 433. The injection surface 433 faces inside the combustion chamber 11, in the ceiling part 111 of the combustion chamber 11. As illustrated in FIG. 2, a substantially entire part of the injection surface 433 is located at the same position as a cavity 31 described later in a direction perpendicular to the axis of the cylinder 14. In other words, the injection surface 433 is included in an area 33 of the cavity described later.

Figure 6:
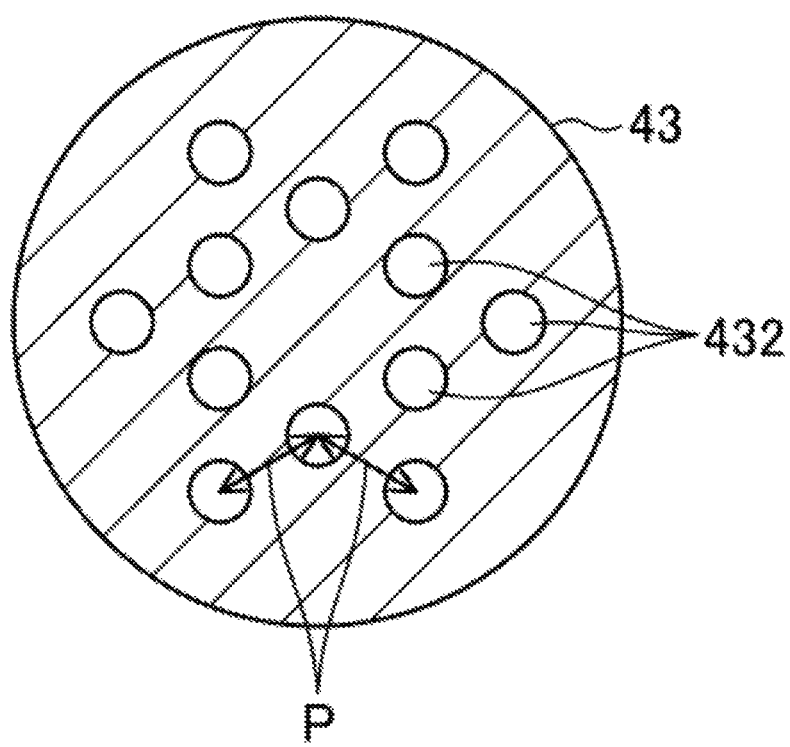
FIG. 6 is an end view at VI-VI in FIG. 3.

As illustrated in FIG. 6, in this example, the nozzle part 43 has twelve nozzle holes 432. The number of the nozzle holes 432 may be a suitable number. The plurality of nozzle holes 432 are parallel to each other. The plurality of nozzle holes 432 are disposed symmetrically to the center of the nozzle part 43. The plurality of nozzle holes 432 are disposed at a substantially equal interval. Here, a distance P between the centers (center-to-center distance) of adjacent nozzle holes 432 is 5 mm or less. As one example, a diameter $\varphi$ of each nozzle hole 432 is $\varphi=1.5$ mm, and the center-to-center distance P of the nozzle holes is P=2.5 mm.

Note that in the water injection device 4, the nozzle part 43 may be omitted, and the lower end surface of the body part 422 may be disposed so as to face the ceiling part 111 of the combustion chamber 11.

The cavity 31 is formed in an upper surface of the piston 3. As illustrated in FIG. 2, the cavity 31 has a circular shape in a plan view. The center of the circle of the cavity 31 is located on the center line (see a one-dot chain line in FIG. 2) between the intake side and the exhaust side of the cylinder 14. The cavity 31 is located at the rear side of the engine 1 with respect to the center axis X of the cylinder 14. The cavity 31 opposes to the water injection device 4 in the axial direction of the cylinder 14.

In the illustrated example, the diameter of the circle of the cavity 31 is half or less of the diameter of the piston 3. Note that the size of the cavity 31 may be set as a suitable size. However, as will be described later, the cavity 31 has a function for reducing diffusion of water by causing the water injected into the combustion chamber 11 to fall within the area 33 of the cavity. The cavity 31 is preferably not too large.

In the illustrated example, the cavity 31 is comprised of a bottom part 311 and a side wall 312. The cavity 31 is comparatively shallow. The bottom part 311 has a circular shape in the plan view, and is comprised of a flat surface which spreads in a direction perpendicular to the axis of the cylinder 14. The side wall 312 continues to a circumferential edge of the bottom part 311. The bottom part 311 and the side wall 312 are perpendicular to each other. Since the bottom part 311 has the circular shape, the side wall 312 has a cylindrical shape.

A heat barrier layer 32 is formed on the upper surface of the piston 3 and the surface of the cavity 31. The heat barrier layer 32 has a thermal conductivity lower than the piston 3. Note that for example, the piston 3 is made of aluminum or an aluminum alloy. The heat barrier layer 32 reduces heat transfer into the piston 3. Since the heat barrier layer 32 is formed, a cooling loss of the engine 1 can be reduced. In addition, the heat barrier layer 32 has a volumetric specific heat smaller than the piston 3. The calorific capacity of the heat barrier layer 32 is small. If the calorific capacity of the heat barrier layer 32 is small, the temperature of the heat barrier layer 32 changes so as to follow the change in the temperature inside the combustion chamber 11. Since a difference between the combustion temperature and the temperature of the heat barrier layer 32 becomes smaller when mixture gas combusts inside the combustion chamber 11, it can be further reduced that the heat conducts to the piston 3.

The heat barrier layer 32 may be formed by applying a heat-barrier material to the upper surface of the piston 3 and the surface of the cavity 31 and curing the heat-barrier material by a heat treatment. For example, the heat-barrier material includes hollow particles, such as glass balloons, and binders, such as silicone resin. As described above, since the cavity 31 has the simple shape comprised of the bottom part 311 and the side wall 312, it is easy to apply the heat-barrier material to the upper surface of the piston 3 and the surface of the cavity 31. The formation of the heat barrier layer 32 is comparatively easy.

Although details will be described later, the water injection device 4 injects water into the combustion chamber 11, when the combustion chamber 11 is in a compression stroke. Since the water supplied to the water injection device 4 is pressurized by the water pump 53, the water can be injected into the high-pressure combustion chamber 11. As illustrated by a one-dot chain line in FIG. 3, the water injection device 4 injects the water toward the cavity 31. At least a part of the water injected by the water injection device 4 reaches the inside of the cavity 31.

(Configuration for Reducing Diffusion of Water Injected into Combustion Chamber)

As described above, when the large amount of water is injected into the combustion chamber 11, the concentration of water near the spark plug 65 becomes higher in connection with the water being spread inside the combustion chamber 11, and therefore, the spark plug 65 becomes unable to stably ignite the mixture gas.

As a result of the present inventors' examination of this problem, they found injection modes of water by the water injection device 4, the shape of the cavity 31, and combinations thereof which suppress the diffusion of the water injected into the combustion chamber 11, thereby having completed the technology disclosed herein.

As described above, the nozzle part 43 of the water injection device 4 has the plurality of nozzle holes 432. As illustrated in FIG. 3, the plurality of nozzle holes 432 are parallel to each other. According to the present inventors' examination, if the axes of the plurality of nozzle holes 432 are parallel or substantially parallel to each other, jet flows of the water injected by the water injection device 4 become difficult to spread in a direction perpendicular to the injecting direction. Since the water jet flows injected into the combustion chamber 11 from the plurality of nozzle holes 432 move in the same or almost the same direction, the momentum of the water jet flows which move in this direction increases. When the momentum increases, a force which draws in the fluid around the water jet flows injected by the water injection device 4 into the jet flows becomes stronger. In the water injection device 4 of the illustrated example, the axes of all the twelve nozzle holes 432 are parallel or substantially parallel to each other. Since the momentum of the water further increases if the axes of all the nozzle holes 432 are parallel or substantially parallel to each other, the drawing-in effect of the fluid around the jet flows becomes stronger. Thus, the water injection device 4 can reduce the diffusion of the water injected into the combustion chamber 11.

According to the present inventors' examination, if an angular difference between the axes of the nozzle holes 432 is less than 5°, the water jet flows injected by the water injection device 4 become difficult to spread in the direction perpendicular to the injecting direction, thereby reducing the diffusion of the water. Note that in the water injection device 4, the axes of all the nozzle holes 432 do not have to be parallel or substantially parallel to each other.

Moreover, as illustrated in FIG. 6, the center-to-center distance P of the plurality of nozzle holes 432 is comparatively short. If the center-to-center distance P is short, the density of the water injected by the water injection device 4 increases. If the density of the water is higher, the drawing-in effect of the fluid around the jet flows becomes stronger due to the increase in the momentum. According to the present inventors' examination, they found that, if the center-to-center distance P of the nozzle holes 432 is 5 mm or less, the drawing-in effect of the fluid around the jet flows becomes sufficiently strong, thereby reducing the diffusion of the water more effectively.

As illustrated in FIG. 3, the cavity 31 has the flat bottom part 311 and the side wall 312 perpendicular to the bottom part 311. The water injection device 4 injects water toward the inside of the cavity 31. The water injected by the water injection device 4 reaches the bottom part 311 of the cavity 31. The water then spreads in the direction perpendicular to the axis of the cylinder 14 along the bottom part 311, and then reaches the side wall 312. Since the side wall 312 is perpendicular to the bottom part 311, it raises water toward the water injection device 4. Since cavity 31 is comparatively shallow, the side wall 312 can raise the water effectively. The side wall 312 of the cavity 31 reduces that the water spreads to an area other than the cavity 31. The side wall 312 is one example of a raising part.

Since the cavity 31 has the raising part, it can keep the water injected by the water injection device 4 within the area 33 in the cavity. Note that the phrase the "area in the cavity" as used herein refers to, as illustrated in FIG. 3, the area 33 which is comprised of an area inside the cavity 31 dented from the upper surface of the piston 3, and an area from a projected surface of the opening of the cavity 31 which is projected to the ceiling part 111 of the combustion chamber 11 in the axial direction of the cylinder 14, to the opening of the cavity 31. Moreover, the "area other than the cavity 31" is an area other than the "area 33 in the cavity."

Then, as described above when the drawing-in effect of the water jet flows injected by the water injection device 4, and the raising effect of the water by the side wall 312 of the cavity 31 are combined, the water raised by the side wall 312 is drawn toward the jet flows by the drawing-in effect of the water jet flows. Therefore, the raised water is prevented from being spread to areas other than the cavity 31. As a result, the diffusion of the water inside the combustion chamber 11 is reduced more effectively.

The position of the spark plug 65 is offset from the cavity 31 in the direction perpendicular to the axis of the cylinder 14. Therefore, even if the large amount of water is injected into the combustion chamber 11, the concentration of water near the spark plug 65 is kept low by the reduction in the diffusion of the water as described above. Thus, the spark plug 65 is possible to stably ignite the mixture gas.

Figure 7:
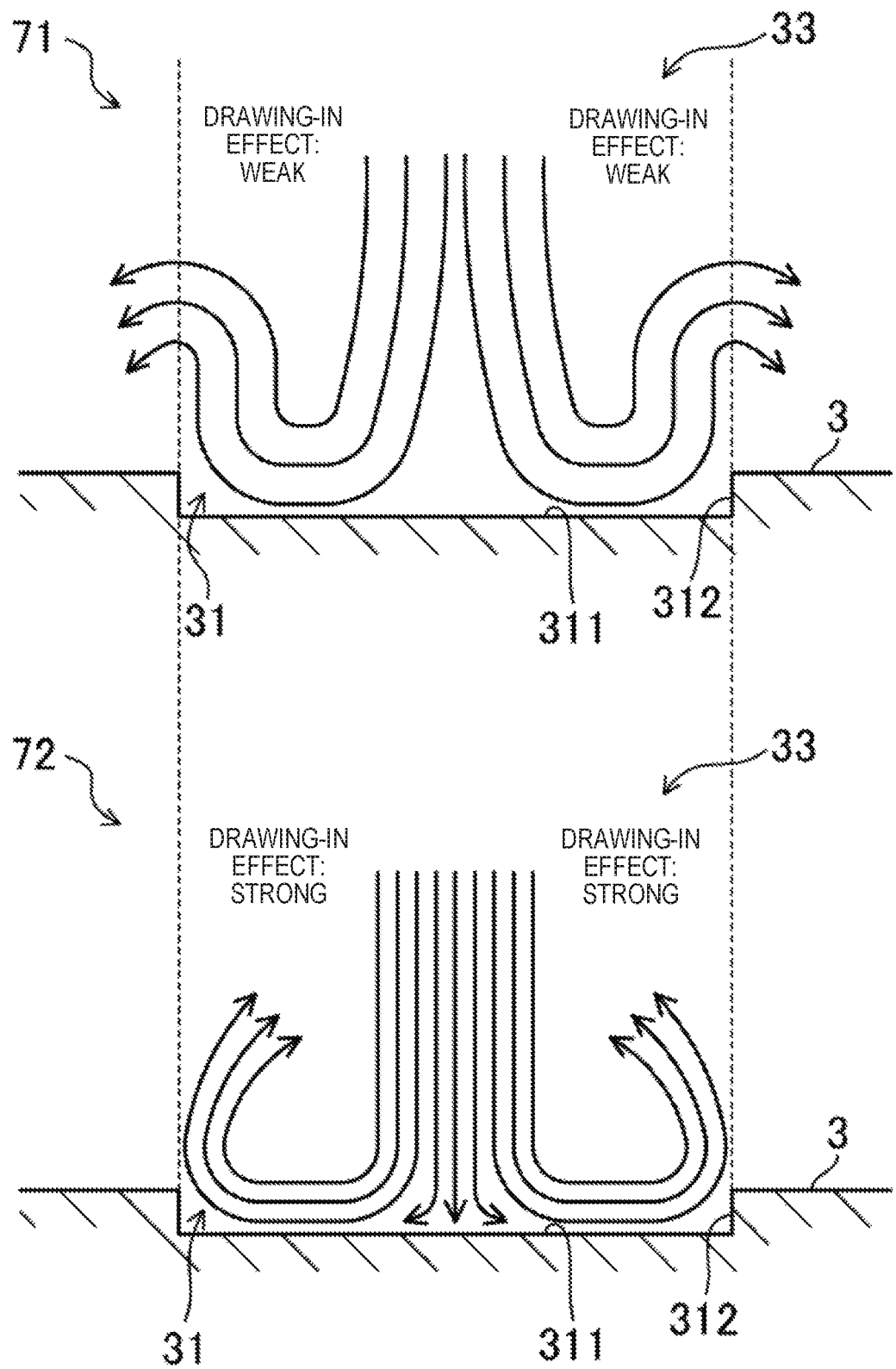
FIG. 7 is a view illustrating a jet flow of water, where an upper part is a case where a density of the nozzle holes is low and a lower part is a case where the density of the nozzle holes is high.

Here, FIG. 7 is a view for comparing a comparative example 71 in which the density of the nozzle holes 432 of the water injection device 4 is low with an embodiment 72 in which the density of the nozzle holes 432 is high. The comparative example 71 and the embodiment 72 are examples in which the water injection device 4 injects water toward the inside of the cavity 31. Note that in the example of FIG. 7, the water injection device 4 injects water along the axis of the cylinder 14, and the water then collides the bottom part 311 of the cavity 31 in the direction perpendicular to the bottom part 311 of the cavity 31, unlike the example of FIG. 3. In both the comparative example 71 and the embodiment 72, the plurality of nozzle holes 432 of the water injection device 4 are parallel to each other.

In the comparative example 71, the center-to-center distance P of the nozzle holes 432 exceeds 5 mm. When the density of the nozzle holes 432 is lower, the momentum of the water jet flows injected by the water injection device 4 becomes smaller. The drawing-in effect described above becomes relatively weak. As a result, the water raised by the side wall 312 of the cavity 31 will not be drawn toward the jet flows. As illustrated by an arrow in the upper part of FIG. 7, in the comparative example 71, the water raised by the side wall 312 of the cavity 31 spreads to areas other than the cavity.

On the other hand, in the embodiment 72, the center-to-center distance P of the nozzle holes 432 is 5 mm or less. In the embodiment 72, the density of the nozzle holes 432 is high. Since the momentum of the water jet flows injected by the water injection device 4 is larger as described above when the density of the nozzle holes 432 is higher, the drawing-in effect described above is stronger. As a result, the water raised by the side wall 312 of the cavity 31 is drawn toward the jet flows. As illustrated by an arrow in the lower part of FIG. 7, in the embodiment 72, the water raised by the side wall 312 of the cavity 31 comes to fall within the area 33 of the cavity.

Thus, the water injection device 4 has the plurality of nozzle holes 432 parallel or substantially parallel to each other and increases the density of the nozzle holes 432, and the side wall 312 of the cavity 31 raises the water, thereby reducing that the water is spread inside the combustion chamber 11.

Here, as illustrated by the one-dot chain line in FIG. 3, at least some of the nozzle holes 432 of the water injection device 4 are directed to the side wall 312 of the cavity 31 at the timing of injecting the water. The water reaching the central part of the bottom part 311 of the cavity 31 is slowed down while spreading along the bottom part 311. If a flow velocity of the water is low when the flow reaches the side wall 312, the water becomes difficult to be raised.

If at least some of the nozzle holes 432 are directed to the side wall 312, at least a portion of the water injected by the water injection device 4 reaches near the side wall 312. Therefore, the raising part 312 can raise the water, while the flow velocity of the water does not decrease. If at least some of the nozzle holes 432 are directed to the side wall 312 at the timing of injecting the water, it can effectively reduce that the water is spread to areas other than the cavity.

Note that if the direction of the axes of the nozzle holes 432 is inclined to the axis of the cylinder 14 like the example illustrated in FIG. 3, the position at which the extension of the axes of the nozzle holes 432 and the cavity 31 cross changes according to the position of the piston 3. That is, if the timing at which the water injection device 4 injects the water changes, the position where the water injected by the water injection device 4 reaches also changes. The water injection device 4 may inject the water toward the cavity 31 at a timing when extensions of the axes of at least some of the nozzle holes 432 intersects with the cavity 31.

In addition, the diffusion of the water can also be reduced by the water injection device 4 injecting water in a compression stroke. During a compression stroke, the pressure inside the combustion chamber 11 is relatively high, and a flow of gas inside the combustion chamber 11 is weaker than that of an intake stroke. Therefore, if water is injected into the combustion chamber 11 in a compression stroke, the diffusion of the water by the flow of the gas inside the combustion chamber 11 is reduced.

Figure 8:
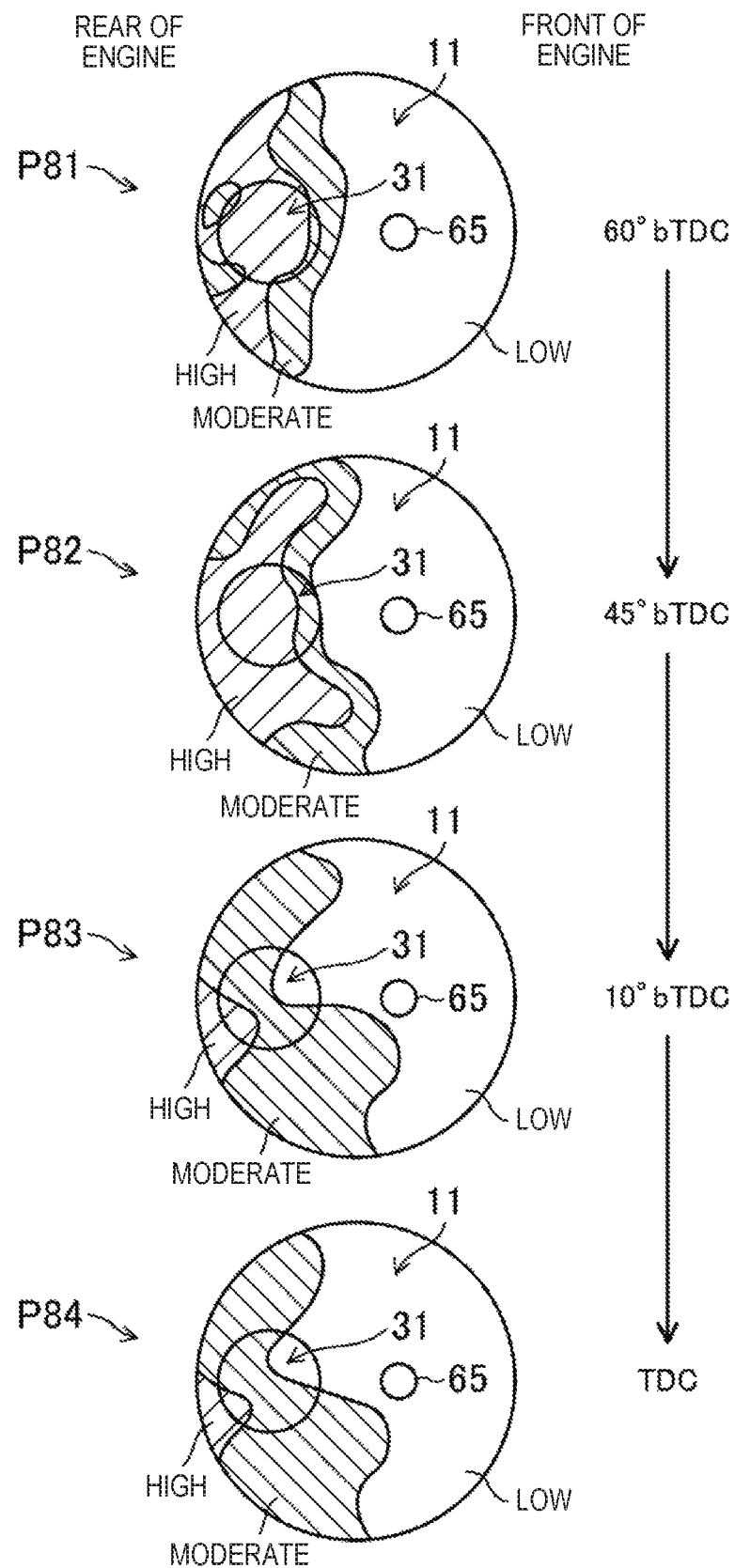
FIG. 8 is a view illustrating a change in a concentration distribution of water inside the combustion chamber.

FIG. 8 illustrates a simulation result of a concentration distribution of water in the combustion chamber structure of the embodiment. FIG. 8 illustrates a change in the concentration distribution of water accompanying an advance of a crank angle. In FIG. 8, P81 indicates a concentration distribution of water at 60° bTDC (before Top Dead Center) where it is immediately after the water injection device 4 finished the water injection in a compression stroke, P82 indicates a concentration distribution of water at 45° bTDC, P83 indicates a concentration distribution of water at 10° bTDC, and P84 indicates a concentration distribution of water at TDC. In FIG. 8, the combustion chamber is divided into three areas comprised of an area where the concentration of water is high, an area where the concentration of water is low, and an area where the concentration of water is moderate.

As illustrated by P81, the concentration of water in an area on the rear side of the engine 1 including the cavity 31 immediately after the water injection is finished is high, and the concentration of water of an area on the front side of the engine 1 including the spark plug 65 is low. Since the water is spread as the compression stroke progresses (P82 and P83), the area where the concentration of water is high becomes smaller, but the area on the front side of the engine 1 is still low in the concentration of water. The water widely spread inside the combustion chamber 11 is suppressed. Further, as illustrated by P84, also at TDC before and after the timing at which the spark plug 65 performs ignition, the concentration of water is kept low in an area near the spark plug 65. Therefore, the spark plug 65 can ignite the mixture gas stably.

Figure 9:
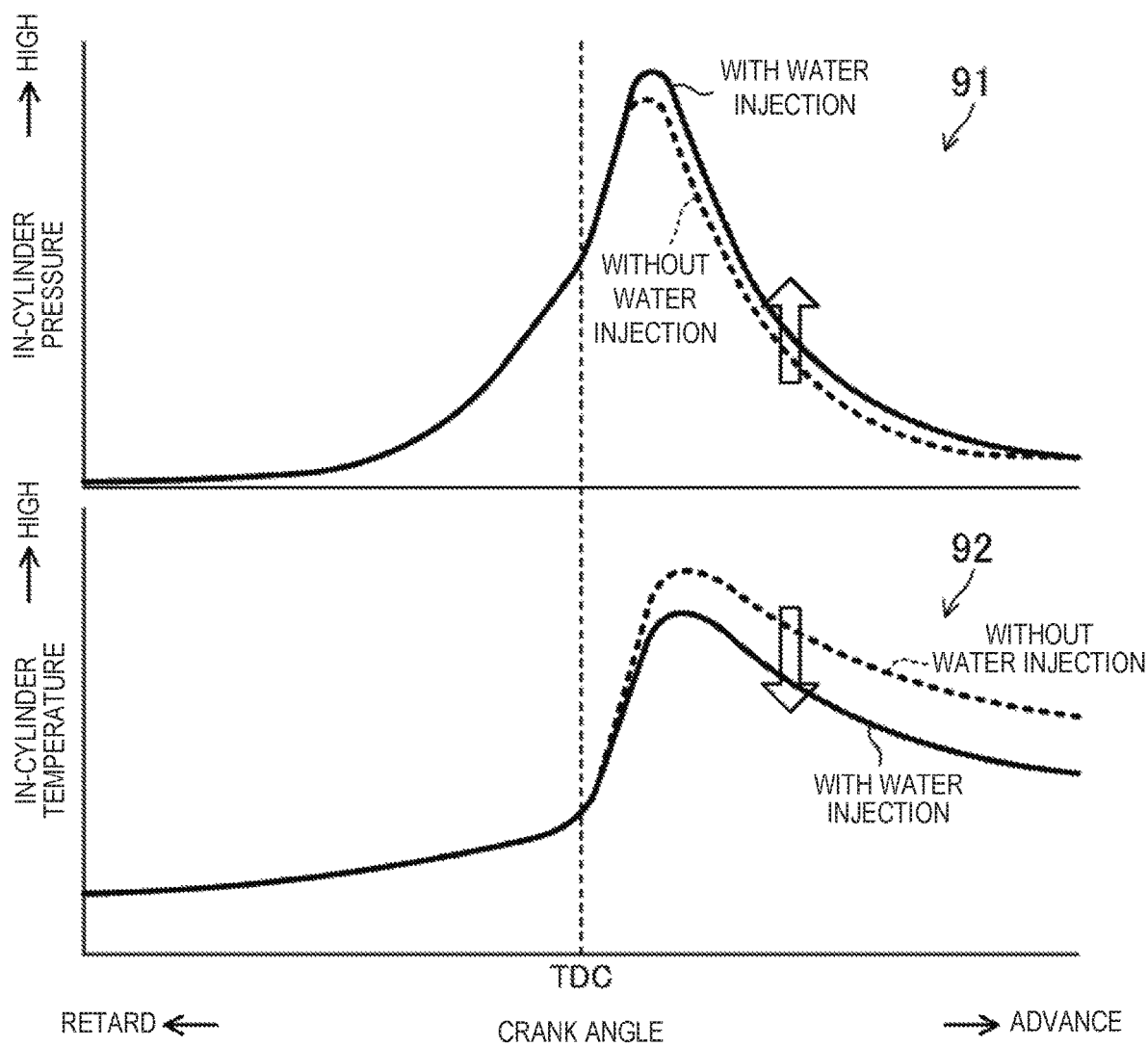
FIG. 9 is a view illustrating a change of an in-cylinder pressure (upper graph) and a change of an in-cylinder temperature (lower graph) when water is injected into the combustion chamber and when water is not injected.

The reference character "91" in FIG. 9 is for comparing a change in an in-cylinder pressure when water is injected into the combustion chamber 11 (solid line) with a change in the in-cylinder pressure when water is not injected into the combustion chamber 11 (broken line). The reference character "92" in FIG. 9 is for comparing a change in the in-cylinder temperature when water is injected into the combustion chamber 11 (solid line) with a change in the in-cylinder temperature when water is not injected into the combustion chamber 11 (broken line). The horizontal axis of FIG. 9 is a crank angle. By injecting water into the combustion chamber 11, the in-cylinder pressure increases by the increase in the amount of operative gas, as described above. The torque of the engine 1 can be improved by injecting water into the combustion chamber 11. In addition, the temperature inside the combustion chamber 11 drops by injecting the water into the combustion chamber 11. Therefore, the occurrence of abnormal combustion can be reduced by injecting the water into the combustion chamber 11.

The water injection device 4 and the water supply device 5 having the above structure heat the water by utilizing the waste heat of the engine 1, and inject vaporized water into the combustion chamber 11. Since the exhaust loss of the engine 1 can be reduced, the thermal efficiency of the engine 1 improves. Moreover, since the water supplied to the combustion chamber 11 is the water extracted from exhaust gas, it is also advantageous that a user does not need to feed water for injection into a water tank in the water injection device 4 and the water supply device 5 of the above structure.

(Configuration of Control Device of Engine)

Figure 10:
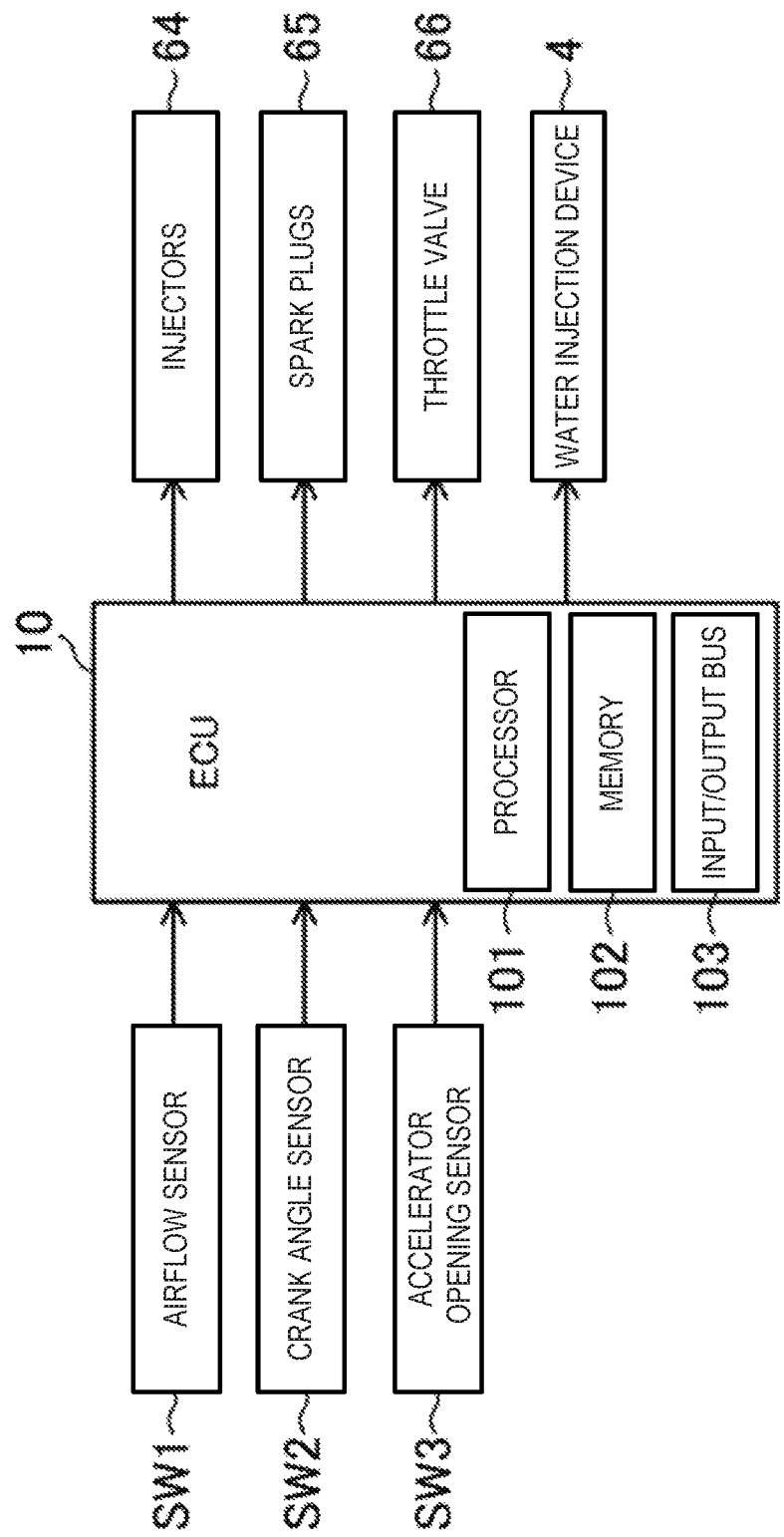
FIG. 10 is a block diagram illustrating a configuration of a control device of the engine.

FIG. 10 illustrates a configuration of a control device of the engine 1. The control device of the engine 1 is provided with the ECU 10. The ECU 10 is a controller based on a well-known microcomputer, and includes a processor (e.g., a central processing unit (CPU)) 101 which executes a program, memory 102 which is, for example, comprised of RAM (Random Access Memory) and ROM (Read Only Memory) and stores the program and data, and an input/output bus 103 which accepts an input of an electric signal and outputs an electric signal.

The ECU 10 is connected to various kinds of sensors SW1-SW3. Each of the sensors SW1-SW3 outputs a signal to the ECU 10. The sensors at least include the following sensors.

An airflow sensor SW1 is disposed in the intake pipe 61 and measures a flow rate of air flowing through the intake pipe 61. A crank angle sensor SW2 is attached to the engine 1 and measures a rotation angle of the crankshaft. An accelerator opening sensor SW3 is attached to an accelerator pedal mechanism (not illustrated) and measures an accelerator opening corresponding to an amount of operation of an accelerator pedal.

The ECU 10 determines an operating state of the engine 1 based on the signals from the sensors SW1-SW3 and calculates a controlled variable of each device according to given control logic. The control logic is stored in the memory 102. The control logic includes calculating target amounts and/or the controlled variables by using operation map(s) stored in the memory 102.

The ECU 10 outputs an electric signal according to the calculated controlled variable to each of the injector 64, the spark plug 65, the throttle valve 66, and the water injection device 4.

Figure 11:
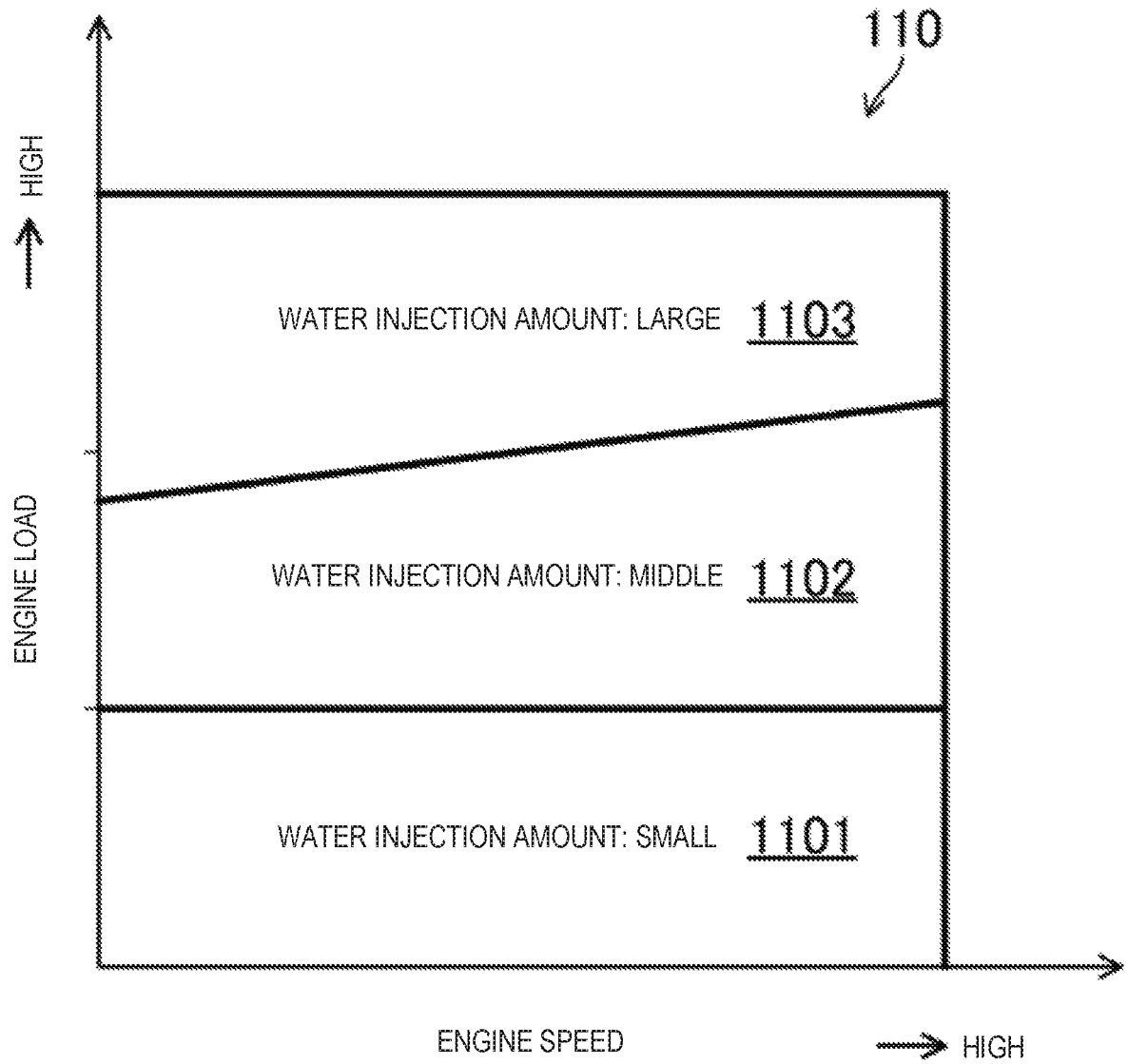
FIG. 11 is a view illustrating a control map related to an injection amount of water.

FIG. 11 illustrates a control map 110 according to an injection amount of water. For example, the control map 110 is stored in the memory 102. The injection amount of water is determined based on a relation between an engine speed and an engine load of the engine 1. The ECU 10 acquires the engine speed and load based on the signals from the sensors SW1-SW3, and determines the injection amount of water based on the acquired engine speed and load, and the control map 110.

In more detail, the control map 110 illustrated in FIG. 11 is divided into three areas comprised of a first area 1101, a second area 1102, and a third area 1103, according to the engine load. The second area 1102 is an area where the engine load is higher than the first area 1101. The third area 1103 is an area where the engine load is higher than the first area 1101 and the second area 1102. The first area 1101 substantially corresponds to a low-load range, the second area 1102 substantially corresponds to a middle-load range, and the third area 1103 substantially corresponds to a high-load range. Here, the low-load range, the middle-load range, and the high-load range may be formed by equally dividing the entire operating range of the engine 1 into three ranges.

The first area 1101 corresponds to the low-load range, as described above. The first area 1101 extends from the minimum speed to the maximum speed in terms of the engine speed. In the first area 1101, the injection amount of water is small. This is because the exhaust energy is low when the engine load is low. That is, if the engine load is low, a large amount of water cannot fully be heated by utilizing the waste heat.

The second area 1102 corresponds to the middle-load range. The second area 1102 extends from the minimum speed to the maximum speed in terms of the engine speed. In the second area 1102, the injection amount of water is larger than the first area 1101. Since the exhaust energy increases as the engine load becomes higher, the amount of water which can be heated by utilizing the waste heat of the engine 1 increases.

The third area 1103 corresponds to the high-load range. The third area 1103 extends from the minimum speed to the maximum speed in terms of the engine speed. In the third area 1103, the injection amount of water is larger than the first area 1101 and the second area 1102. In the high-load range, the abnormal combustion is easier to occur. In the third area 1103, by increasing the injection amount of water, the engine torque can be improved and the occurrence of abnormal combustion can be reduced.

Here, a boundary between the second area 1102 and the third area 1103 is inclined in FIG. 11. That is, when the engine speed is higher, the second area 1102 extends toward the higher load side. On the other hand, when the engine speed is lower, the third area extends toward the lower load side. This is because, when the engine speed increases, it becomes difficult to secure the time for fully heating the water since a time interval for injecting the water into the combustion chamber 11 becomes shorter. When the engine speed is high, by expanding the second area 1102 where the injection amount of water is small, fully heated water can be injected into the combustion chamber 11 and therefore, the engine torque can be increased. On the other hand, when the engine speed is low, by expanding the third area where the injection amount of water is large, the amount of water injected into the combustion chamber 11 can be increased and the engine torque can be further increased. Therefore, it becomes advantageous in improving fuel efficiency of the automobile carrying the engine 1.

Figure 12:
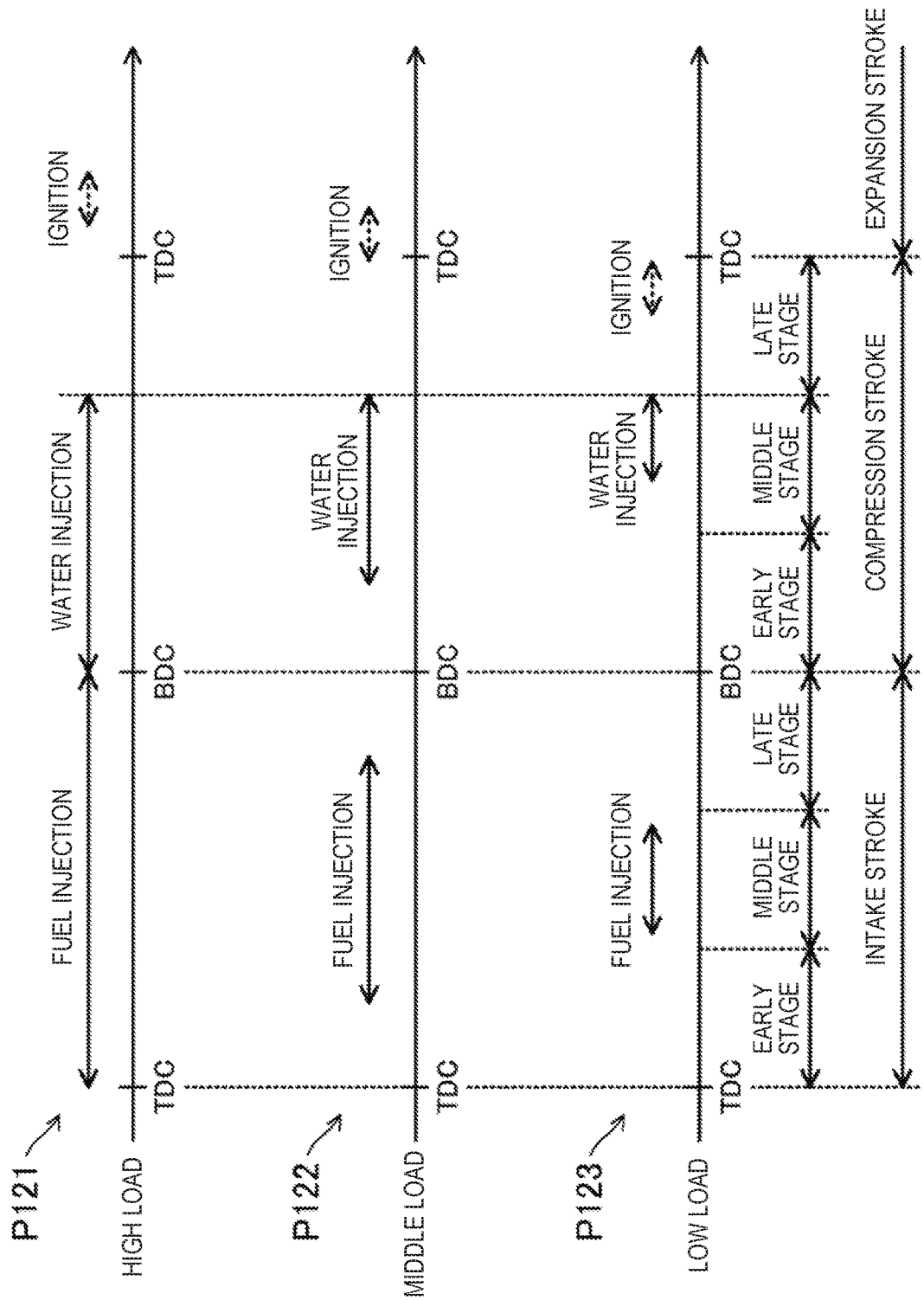
FIG. 12 is a view illustrating an injection timing of fuel, an injection timing of water, and an ignition timing in each of cases where the engine load is high (upper part), where the engine load is middle (middle part), and the engine load is low (lower part).

FIG. 12 illustrates a fuel injection, a water injection, and an ignition timing by the control of the ECU 10. The horizontal axis in FIG. 12 is a crank angle. A both-ends arrow in FIG. 12 indicates a period of injection.

The injector 64 of the engine 1 is disposed at the intake port 15. The injector 64 injects fuel into the intake port 15 in an intake stroke. The fuel is introduced into the combustion chamber 11 with intake air. A homogeneous mixture gas is formed inside the combustion chamber 11. The homogeneous mixture gas is advantageous for stable ignition by the spark plug 65 and stable compression ignition. If the engine load is higher, the injection amount of fuel increases. In the example of FIG. 12, the injector 64 injects fuel through substantially the entire period from the start of an intake stroke to the end of the intake stroke, at a high load P121.

When the intake stroke has ended, the water injection device 4 injects water into the combustion chamber 11 in the subsequent compression stroke. When the engine load is higher, the injection amount of water is larger (see FIG. 11). The period of the water injection device 4 injecting water is long. The water injection device 4 injects water into the combustion chamber 11 during a period from an early stage to a middle stage of a compression stroke. The pressure inside the combustion chamber 11 is low from the early stage to the middle stage of the compression stroke. Even if the temperature of water injected into the combustion chamber 11 is low, the water evaporates. Since the pressure inside the combustion chamber 11 is high during the late stage of the compression stroke, the water does not evaporate unless the temperature of the water injected into the combustion chamber 11 is high. The injection of the water during the period from the early stage to the middle stage of the compression stroke enables the water to be evaporated by utilizing the waste heat of the engine 1. Therefore, it becomes advantageous in improving the thermal efficiency of the engine 1.

Note that the terms "early stage," "middle stage," and "late stage" in a compression stroke as used herein may be defined by equally dividing the period of the compression stroke into three stages. The same also applies to an early stage, a middle stage, and a late stage of an intake stroke, which are described below.

When the engine load is high, the spark plug 65 retards the ignition timing. The spark plug 65 performs ignition after a compression top dead center. Thus, the occurrence of abnormal combustion can be reduced. The spark plug 65 may ignite the mixture gas within a period indicated by a broken-line arrow in FIG. 12.

When the engine 1 is at the middle load (P122), the injection amount of fuel becomes less than that at the high load. The injection period of fuel by the injector 64 is relatively short. The injector 64 injects fuel during a period including the middle stage of an intake stroke. A descending speed of the piston 3 is faster in the middle stage of the intake stroke. When fuel is injected during the middle stage of the intake stroke, the injected fuel is spread and the mixture gas becomes homogeneous or substantially homogeneous. Note that the injection timing of fuel when the engine 1 is at the middle load may be set as a suitable timing.

When the intake stroke is ended, the water injection device 4 injects water into the combustion chamber 11 in the subsequent compression stroke. When the engine 1 is at the middle load, the injection amount of water becomes less than that at the high load (see FIG. 11). The period of the water injection device 4 injecting water is relatively short. The water injection device 4 delays a start timing of injecting the water. If the water is injected into the combustion chamber 11 at an early timing in a compression stroke, a compression resistance increases by the increase in the operative gas. By delaying the start timing of injecting the water, the increase in the compression resistance can be avoided. Therefore, the thermal efficiency of the engine 1 improves. The water injection device 4 completes the injection before the middle stage of the compression stroke, similar to the case with the high load. Therefore, an amount of heat required for heating the water can be saved.

When the engine 1 is at the middle load, the spark plug 65 advances the ignition timing more than that at the high load. Therefore, the occurrence of the abnormal combustion is reduced, and the engine torque is improved by the optimization of the ignition timing. The spark plug 65 may ignite the mixture gas within a period illustrated by a broken-line arrow in FIG. 12 after a compression top dead center.

When the engine 1 is at the low load (P123), the injection amount of fuel becomes less than that at the middle load. The injection period of fuel by the injector 64 is relatively short. The injector 64 injects fuel during a period including the middle stage of an intake stroke. Therefore, the mixture gas becomes homogeneous or substantially homogeneous. Note that the injection timing of fuel when the engine load is low may be set as a suitable timing.

When the intake stroke is ended, the water injection device 4 injects water into the combustion chamber 11 in the subsequent compression stroke. When the engine load is low, the injection amount of water becomes less than that at the middle load (see FIG. 11). The period of the water injection device 4 injecting the water is relatively short. The water injection device 4 further delays the start timing of injecting water. Therefore, the increase in the compression resistance can be avoided. The water injection device 4 completes the injection before the middle stage of the compression stroke, similar to the cases at the high load and the middle load. Therefore, the amount of heat required for heating the water can be saved.

When the engine load is low, the spark plug 65 advances the ignition timing more than that at the middle load. As illustrated in FIG. 12, the spark plug 65 may ignite the mixture gas before a compression top dead center. The engine torque can be improved by the optimization of the ignition timing.

Note that the combustion chamber structure of the engine disclosed herein is not limited to the application to the engine 1 having the structure described above. The combustion chamber structure of the engine disclosed herein can be applied to engines having various structures.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine
11 Combustion Chamber
111 Ceiling Part
14 Cylinder
15 Intake Port
3 Piston
311 Bottom Part
312 Side Wall (Raising Part)
32 Heat Barrier Layer
4 Water Injection Device
41 Water Injection Valve
42 Temperature Increasing Part
421 Attachment Part
422 Body Part
423 Heat Conducting Part
432 Nozzle Hole
433 Injection Surface
44 Heat Pipe (Heating Device)
45 Passage
46 Non-passage Part
5 Water Supply Device
51 Condenser
52 Water Tank
53 Water Pump
54 Heat Exchanger (Heating Device)
62 Exhaust Pipe
64 Injector (Fuel Injection Valve)
65 Spark Plug

What is claimed is:

1. An engine system, comprising:
a combustion chamber including a cylinder formed in an engine and a piston configured to reciprocate inside the cylinder;
a spark plug disposed in a ceiling part of the combustion chamber; and
a water injection device configured to inject water into the combustion chamber through a plurality of nozzle holes facing the inside of the combustion chamber,
wherein the piston has a cavity in an upper surface thereof,
wherein the water injection device injects water into the cavity in a compression stroke at a timing when an extension of axes of at least some of the nozzle holes intersect the cavity,
wherein the cavity has a bottom part where the water injected by the water injection device collides, and a raising part configured to raise the water spreading along the bottom part toward the water injection device,
wherein the water injection device is disposed in the ceiling part, and at least a part of an injection surface of the water injection device, where the nozzle holes open, is located at a position of the cavity in a direction perpendicular to an axis of the cylinder,
wherein the spark plug is installed at a position offset from the cavity in the direction perpendicular to the axis of the cylinder,
wherein a center of the cavity is offset from a center of the cylinder, and
wherein the spark plug is provided at a location offset to an opposite side from the cavity relative to the center of the cylinder.

2. The engine system of claim 1,
wherein the bottom part is comprised of a flat surface perpendicular to the axis of the cylinder, and
wherein the raising part is comprised of a side wall perpendicular to the bottom part.

3. The engine system of claim 1, wherein a heat barrier layer configured to reduce heat transfer into the piston is provided to the upper surface of the piston and the surface of the cavity.

4. The engine system of claim 2, wherein a heat barrier layer configured to reduce heat transfer into the piston is provided to the upper surface of the piston and the surface of the cavity.

5. The engine system of claim 1, wherein at least some of the nozzle holes of the water injection device are directed toward the raising part of the cavity at a timing of injecting the water.

6. The engine system of claim 1, wherein the axes of all the nozzle holes of the water injection device are parallel or substantially parallel to each other.

7. The engine system of claim 6, wherein a distance between the centers of the nozzle holes is 5 mm or less.

8. The engine system of claim 1, wherein the water injection device is provided with a heating device configured to heat the water injected by the water injection device.

9. The engine system of claim 8,
wherein the heating device has a heat exchanger attached to an exhaust pipe of the engine, and
wherein the heat exchanger heats the water by heat of exhaust gas of the engine before supplying the water to the water injection device.

10. The engine system of claim 8,
wherein the water injection device has a water injection valve, and a temperature increasing part provided between the water injection valve and the combustion chamber, and configured to raise a temperature of the water injected by the water injection valve before supplying the water to the combustion chamber, and
wherein the heating device has a heat pipe configured to send the heat of exhaust gas of the engine to the temperature increasing part.

11. The engine system of claim 1, further comprising a water supply device configured to supply water to the water injection device, the water supply device including:

a condenser configured to condense water inside exhaust gas of the engine;

a water tank configured to collect water condensed by the condenser; and a water pump configured to pressurize water inside the water tank and supply the water to the water injection device.

12. The engine system of claim 1, further comprising a fuel injection valve configured to inject fuel, the fuel injection valve being disposed in an intake port communicating with the combustion chamber.

13. The engine system of claim 1, wherein the engine is a compression ignition gasoline engine in which at least a part of mixture gas combusts by compression ignition.

14. An engine system, comprising:

a combustion chamber including a cylinder formed in an engine and a piston configured to reciprocate inside the cylinder;

a spark plug disposed in a ceiling part of the combustion chamber; and a water injection device configured to inject water into the combustion chamber through a plurality of nozzle holes facing the inside of the combustion chamber, wherein the piston has a cavity in an upper surface thereof, wherein the water injection device injects water into the cavity in a compression stroke at a timing when an extension of axes of at least some of the nozzle holes intersect the cavity, wherein the cavity has a bottom part where the water injected by the water injection device collides, and a raising part configured to raise the water spreading along the bottom part toward the water injection device, wherein the water injection device is disposed in the ceiling part, and at least a part of an injection surface of the water injection device, where the nozzle holes open, is located at a position of the cavity in a direction perpendicular to an axis of the cylinder, wherein the spark plug is installed at a position offset from the cavity in the direction perpendicular to the axis of the cylinder, wherein when the compression stroke is divided into three stages of an early stage, a middle stage, and a late stage, the water injection device performs a water injection during a period from the early stage to the middle stage of the compression stroke, and wherein the water injection is completed in the middle stage of the compression stroke regardless of an engine load.

15. The engine system of claim 14, wherein the bottom part is comprised of a flat surface perpendicular to the axis of the cylinder, and wherein the raising part is comprised of a side wall perpendicular to the bottom part.

16. The engine system of claim 14, wherein a heat barrier layer configured to reduce heat transfer into the piston is provided to the upper surface of the piston and the surface of the cavity.

17. The engine system of claim 15, wherein a heat barrier layer configured to reduce heat transfer into the piston is provided to the upper surface of the piston and the surface of the cavity.

18. The engine system of claim 14, wherein at least some of the nozzle holes of the water injection device are directed toward the raising part of the cavity at the timing of injecting the water.

19. The engine system of claim 14, wherein the axes of all the nozzle holes of the water injection device are parallel or substantially parallel to each other.

20. The engine system of claim 14, wherein the water injection is completed in the middle stage of the compression stroke at low engine load, middle engine load, and high engine load.

* * * * *